(12) United States Patent
Na et al.

(10) Patent No.: US 11,276,529 B2
(45) Date of Patent: Mar. 15, 2022

(54) ELECTRONIC COMPONENT AND BOARD HAVING THE SAME MOUNTED THEREON

(71) Applicant: SAMSUNG ELECTRO-MECHANICS CO., LTD., Suwon-si (KR)

(72) Inventors: Jae Young Na, Suwon-si (KR); Ki Young Kim, Suwon-si (KR); Beom Joon Cho, Suwon-si (KR); Ji Hong Jo, Suwon-si (KR); Woo Chul Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 43 days.

(21) Appl. No.: 16/850,768

(22) Filed: Apr. 16, 2020

(65) Prior Publication Data

US 2021/0065987 A1 Mar. 4, 2021

(30) Foreign Application Priority Data

Aug. 29, 2019 (KR) .................. 10-2019-0106432

(51) Int. Cl.
*H01G 4/30* (2006.01)
*H01G 4/12* (2006.01)
*H01G 2/06* (2006.01)
*H01G 4/008* (2006.01)
*H01G 4/012* (2006.01)

(52) U.S. Cl.
CPC .............. *H01G 4/30* (2013.01); *H01G 2/065* (2013.01); *H01G 4/008* (2013.01); *H01G 4/012* (2013.01); *H01G 4/1209* (2013.01)

(58) Field of Classification Search
CPC .......... H01G 4/224; H01G 4/248; H01G 4/30; H01G 4/38; H01G 4/012; H01G 4/1227; H01G 4/1245; H01G 4/065; H01G 4/0085; H01G 4/40; H01G 4/12; H01G 4/008; H01G 4/1209; H05K 1/0231
See application file for complete search history.

(56) References Cited

U.S. PATENT DOCUMENTS

| 2015/0014038 A1* | 1/2015 | Park ..................... H01G 4/248 174/260 |
| 2017/0287645 A1* | 10/2017 | Masuda ................ H01G 4/005 |
| 2018/0374639 A1 | 12/2018 | Akiyoshi |
| 2018/0374640 A1* | 12/2018 | Akiyoshi ............... H01G 4/12 |
| 2018/0374642 A1* | 12/2018 | Akiyoshi ............... H01G 4/30 |
| 2019/0096582 A1* | 3/2019 | Saito ..................... H05K 1/181 |
| 2020/0118757 A1* | 4/2020 | Kageyama .......... H05K 3/3442 |

FOREIGN PATENT DOCUMENTS

| JP | 2019-9359 A | 1/2019 |
| KR | 10-1996-0009137 A | 3/1996 |

* cited by examiner

*Primary Examiner* — Michael P McFadden
(74) *Attorney, Agent, or Firm* — Morgan, Lewis & Bockius LLP (57) ABSTRACT

An electronic component and a board having the same mounted thereon are provided. The electronic component includes: a body; an electrode disposed on an end of the body in a first direction; a metal frame including a support layer bonded to the external electrode, a mounting portion extending in the first direction in a lower end of the support layer and having a protruding portion on a lower surface, and a coating film formed to cover an upper surface of the protruding portion on an upper surface of the mounting portion and including titanium (Ti).

20 Claims, 9 Drawing Sheets

ELECTRONIC COMPONENT AND BOARD HAVING THE SAME MOUNTED THEREON

CROSS-REFERENCE TO RELATED APPLICATION(S)

This application claims benefit of priority to Korean Patent Application No. 10-2019-0106432 filed on Aug. 29, 2019 in the Korean Intellectual Property Office, the disclosure of which is incorporated herein by reference in its entirety.

TECHNICAL FIELD

The present disclosure relates to an electronic component and a board having the same mounted thereon.

BACKGROUND

Multilayer capacitors are used in many electronic devices due to their small size and high capacity.

Recently, due to fast growing interest in eco-friendly vehicles and electric vehicles, power driving systems in vehicles are increasing, and accordingly, demand for multilayer capacitors required for vehicles is also increasing.

In addition, components for a vehicle require high levels of heat and electrical reliability, and thus, the performance requirements of multilayer capacitors are gradually increasing.

Accordingly, there is demand for a structure of a multilayer capacitor which is highly resistant to vibrations and deformation.

In order to improve durability against such vibrations and deformation, an electronic component having a structure in which a multilayer capacitor is mounted while being spaced apart from a board by a predetermined distance using a metal frame is disclosed.

However, in the case of an electronic component using a metal frame according to the related art, the mounting density may be low in a limited space, and an insulation distance between left and right metal frames is not sufficiently ensured, so insulating properties between adjacent electronic components may be lowered.

SUMMARY

An aspect of the present disclosure is to provide an electronic component and a board having the same mounted thereon, and, in a multilayer capacitor using a metal frame, the mounting density may be increased in a limited space, and an insulation distance between left and right metal frames is sufficiently ensured, so insulating properties between adjacent electronic components may be secured.

According to an aspect of the present disclosure, an electronic component includes: a body; first and second external electrodes disposed on both ends of the body in a first direction, respectively; a first metal frame including a first support layer bonded to the first external electrode, a first mounting portion extending in the first direction in a lower end of the first support layer and having a first protruding portion on a lower surface, and a first coating film covering an upper surface of the first protruding portion on an upper surface of the first mounting portion and including titanium (Ti); and a second metal frame including a second support layer bonded to the second external electrode, a second mounting portion extending in the first direction in a lower end of the second support layer and having a second protruding portion on a lower surface of the second mounting portion, and a second coating film covering an upper surface of the second protruding portion on an upper surface of the second mounting portion and including Ti.

The first mounting portion may have a first indentation portion in an upper surface of the first mounting portion in a position in which the first protruding portion is disposed, and the second mounting portion may have a second indentation portion in an upper surface of the second mounting portion in a position in which the second protruding portion is disposed.

The first indentation portion may include a first groove portion, and the second indentation portion may include a second groove portion.

The first mounting portion may extend toward an opposite side of the first external electrode, and the second mounting portion may extend toward an opposite side of the second external electrode.

The first and second mounting portions may be composed of one among Ni, Fe, Cu, Ag, and Cr or alloys thereof.

The first and second mounting portions may be composed of stainless steel (SUS).

The first and second mounting portions may be provided with first and second plating layers disposed thereon, respectively.

In this case, the first and second plating layers may include first and second inner plating layers, disposed on surfaces of the first and second mounting portions, respectively, and first and second outer plating layers, disposed on the first and second inner plating layers, respectively.

The body may include a dielectric layer; and first and second internal electrodes alternately arranged with the dielectric layer interposed therebetween, and having one ends exposed through both sides of the body in the first direction to be connected to the first and second external electrodes, respectively.

The first and second external electrodes may include: first and second head portions disposed on both sides of the body in the first direction, respectively; and first and second band portions extending to a portion of upper and lower surfaces and a portion of both side surfaces of the body from the first and second head portions, respectively.

In the first and second metal frames, the first and second support layers may be bonded to first and second head portions of the first and second external electrodes, respectively, and the first and second mounting portions may be spaced apart from the body and the first and second band portions.

The electronic component may further include a first conductive bonding layer disposed between the first external electrode and the first support layer, and a second conductive bonding layer disposed between the second external electrode and the second support layer.

The electronic component may further include third and fourth plating layers disposed on surfaces of the first and second external electrodes, respectively, and the third and fourth plating layers may include third and fourth nickel plating layers covering the first and second external electrodes, respectively, and third and fourth tin plating layers covering the third and fourth nickel plating layers, respectively.

The first coating film may extend from the upper surface of the first protruding portion onto a portion of the upper surface of the first mounting portion, and may be spaced apart from an edge of the upper surface of the first mounting portion. The second coating film may extend from the upper surface of the second protruding portion onto a portion of the upper surface of the second mounting portion, and may be spaced apart from an edge of the upper surface of the second mounting portion.

A surface roughness of the first coating film may be greater than that of the upper surface of the first mounting portion, and a surface roughness of the second coating film may be greater than that of the upper surface of the second mounting portion.

According to another aspect of the present disclosure, a board having an electronic component mounted thereon includes: a board having first and second land patterns spaced apart from each other in an upper surface, and includes the electronic component described above and mounted to connect the first and second protruding portions of the first and second mounting portions of the first and second metal frames to the first and second land patterns of the board, respectively.

According to another aspect of the present disclosure, an electronic component includes: a body; first and second external electrodes disposed on both ends of the body in a first direction, respectively; a first metal frame including a first support layer bonded to the first external electrode, a first mounting portion extending in the first direction in a lower end of the first support layer and having a first protruding portion on a lower surface, and a first coating film covering an upper surface of the first protruding portion on an upper surface of the first mounting portion; and a second metal frame including a second support layer bonded to the second external electrode, a second mounting portion extending in the first direction in a lower end of the second support layer and having a second protruding portion on a lower surface of the second mounting portion, and a second coating film covering an upper surface of the second protruding portion on an upper surface of the second mounting portion. The first coating film extends from the upper surface of the first protruding portion onto a portion of the upper surface of the first mounting portion, and is spaced apart from an edge of the upper surface of the first mounting portion. The second coating film extends from the upper surface of the second protruding portion onto a portion of the upper surface of the second mounting portion, and is spaced apart from an edge of the upper surface of the second mounting portion.

The first mounting portion may have a first indentation portion in the upper surface of the first mounting portion in a position in which the first protruding portion is disposed, and the second mounting portion may have a second indentation portion in the upper surface of the second mounting portion in a position in which the second protruding portion is disposed.

The first indentation portion may include a first groove portion, and the second indentation portion may include a second groove portion.

A surface roughness of the first coating film may be greater than that of the upper surface of the first mounting portion, and a surface roughness of the second coating film may be greater than that of the upper surface of the second mounting portion.

Other features and aspects will be apparent from the following detailed description, the drawings, and the claims.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (board), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

When orientations are defined to clearly describe an embodiment in the present disclosure, X, Y, and Z on the drawings indicate a length direction, a width direction, and a thickness direction of a multilayer capacitor and an electronic component, respectively.

Here, in an embodiment, a Z direction may be used as having the same meaning as a stacking direction in which dielectric layers are stacked on each other.

Figure 1:
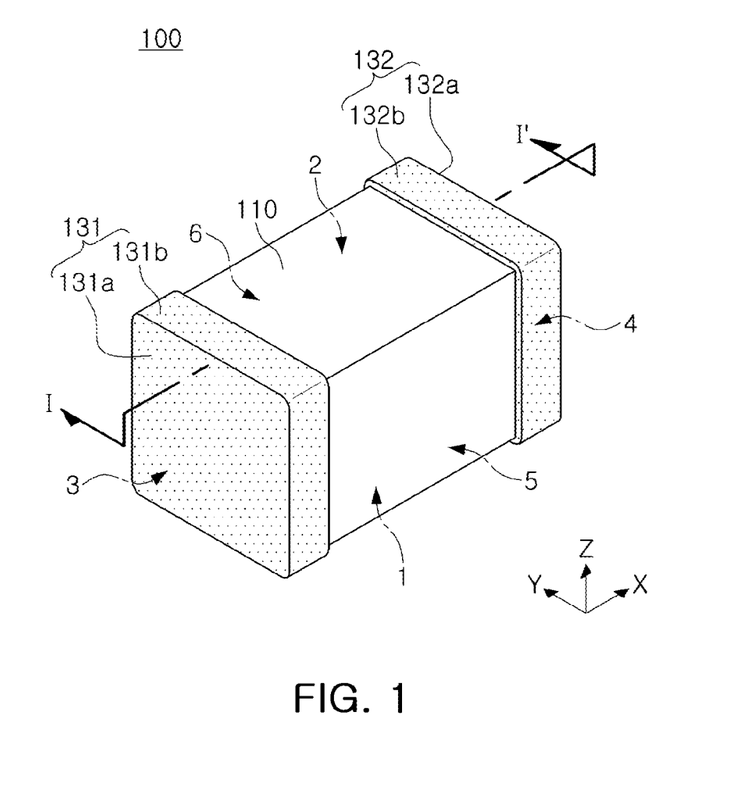
FIG. 1 is a schematic perspective view of a multilayer capacitor applied to an embodiment of the present disclosure.
Figure 2A:
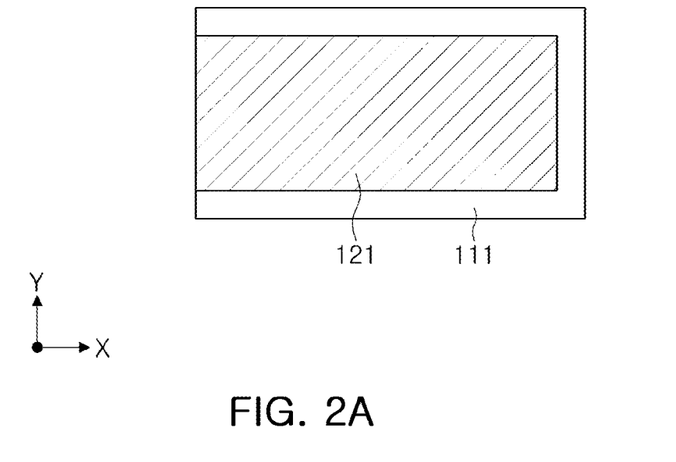
FIGS. 2A and 2B are plan views illustrating first and second internal electrodes, respectively, applied to the multilayer capacitor of FIG. 1.
Figure 2B:
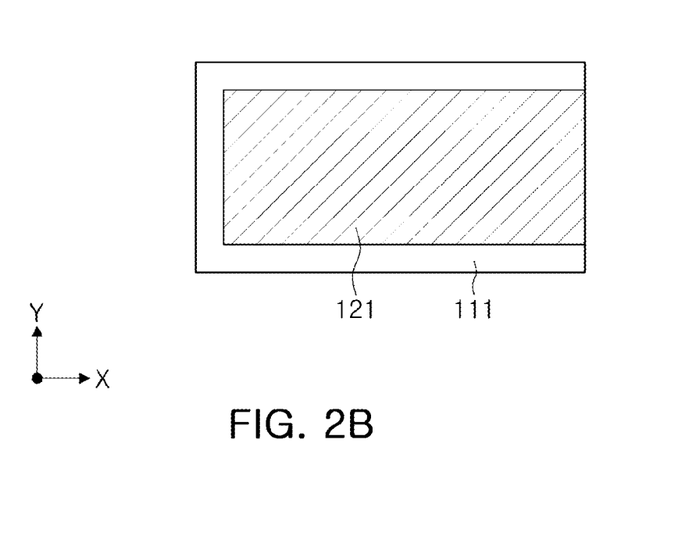
Figure 3:
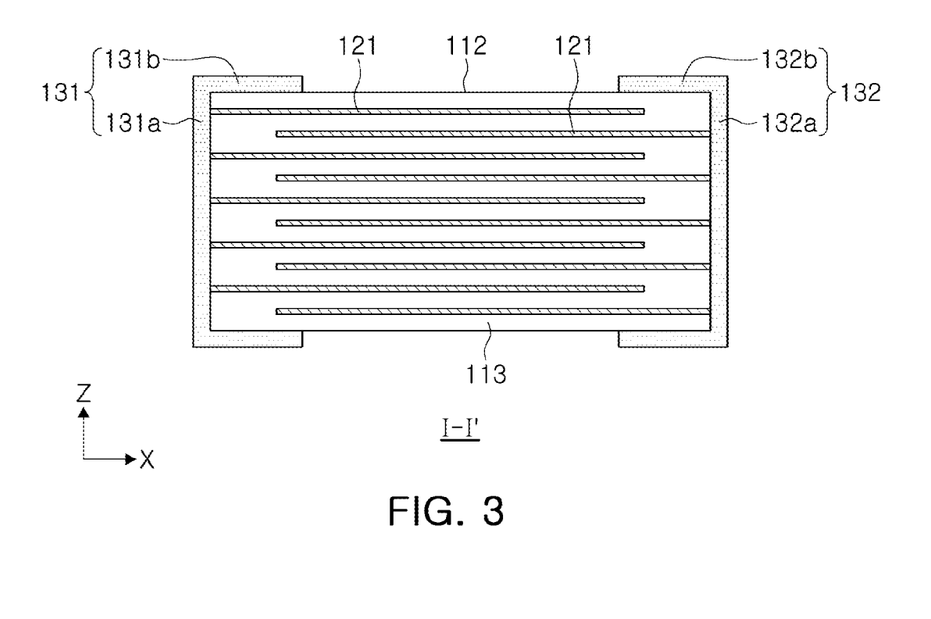
FIG. 3 is a cross-sectional view taken along line I-I' of FIG. 1.

FIG. 1 is a schematic perspective view of a multilayer capacitor applied to an embodiment, FIGS. 2A and 2B are plan views illustrating first and second internal electrodes, respectively, applied to the multilayer capacitor of FIG. 1, and FIG. 3 is a cross-sectional view taken along line I-I' of FIG. 1.

Next, referring to FIGS. 1 to 3, a structure of a multilayer capacitor 100 applied to an electronic component in an embodiment will be described.

Referring to FIGS. 1 to 3, a multilayer capacitor 100 according to an embodiment includes a body 110, and first and second external electrodes 131 and 132 formed on both ends of the body 110, respectively, in an X-direction, defined as a first direction.

The plurality of dielectric layers 111, forming the body 110, are stacked in the Z direction and then sintered, and adjacent dielectric layers 111 of the body 110 are integrated so that boundaries therebetween are not readily apparent without using a scanning electron microscope (SEM).

In addition, the body 110 includes a plurality of dielectric layers 111 and first and second internal electrodes 121 and 122 having different polarities and alternately arranged in the Z direction with the dielectric layer 111 interposed therebetween.

Moreover, the body 110 may include an active region as a portion contributing to formation of the capacity of a capacitor, and cover regions 112 and 113 provided on upper and lower portions of the active region in the Z direction as margin portions.

The body 110, described above, has a shape without limitation, and may have a hexahedral shape, and may include a first surface 1 and a second surface 2, opposing each other in the Z direction, a third surface 3 and a fourth surface 4, connected to the first surface 1 and the second surface 2 and opposing each other in the X direction, and a fifth surface 5 and a sixth surface 6, connected to the first surface 1 and the second surface 2, connected to the third surface 3 and the fourth surface 4 and opposing each other in the W direction.

The dielectric layer 111 may include ceramic powder, for example, $BaTiO_3$-based ceramic powder, or the like.

The $BaTiO_3$-based ceramic powder may be $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca or Zr is partially dissolved in $BaTiO_3$, but an embodiment is not limited thereto.

Moreover, a ceramic additive, an organic solvent, a plasticizer, a binder, a dispersant, and the like may also be added to the dielectric layers 111 along with the ceramic powder.

The ceramic additive may include, for example, a transition metal oxide or a transition metal carbide, a rare earth element, magnesium (Mg), aluminum (Al), or the like.

The first and second internal electrodes 121 and 122 are electrodes to which different polarities are applied, are formed on the dielectric layer 111 and stacked on the Z direction, and may be arranged alternately to oppose each other in the Z direction inside the body 110 with a single dielectric layer 111 interposed therebetween.

In this case, the first and second internal electrodes 121 and 122 may be electrically isolated from each other by the dielectric layers 111 interposed therebetween.

Meanwhile, in an embodiment of the present disclosure, it is illustrated and described that the internal electrodes are stacked in the Z-direction, but an embodiment of the present disclosure is not limited thereto. Alternatively, as required, the internal electrodes may be stacked in the Y-direction.

One ends of the first and second internal electrodes 121 and 122 may be exposed through the third surface S3 and the fourth surface S4 of the body portion 110, respectively.

Here, end portions of the first and second internal electrodes 121 and 122, alternately exposed through the third surface 3 and the fourth surface 4 of the body 110, may be in contact with and electrically connected to the first and second external electrodes 131 and 132, disposed on both ends of the body 110 in the X direction, to be described later.

According to the above configuration, when a predetermined voltage is applied to the first and second external electrodes 131 and 132, charges are accumulated between the first and second internal electrodes 121 and 122.

In this case, the capacitance of the multilayer capacitor 100 is proportional to an area of overlap between the first and second internal electrodes 121 and 122, overlapped in the Z direction in the active region.

In addition, a material, forming the first and second internal electrodes 121 and 122, is not particularly limited. For example, the first and second internal electrodes may be formed using a precious metal material or a conductive paste formed of at least one between nickel (Ni) and copper (Cu).

In this case, a method of printing the conductive paste such as screen printing or gravure printing may be used, but the present disclosure is not limited thereto.

Voltages having different polarities are provided for the first and second external electrodes 131 and 132, and the first and second external electrodes are disposed on both ends of the body 110 in the X direction and are in contact with and electrically connected to exposed end portions of the first and second internal electrodes 121 and 122, respectively.

The first external electrode 131 may include a first head portion 131a and a first band portion 131b.

The first head portion 131a is disposed on the third surface 3 of the body 110, and in contact with an end portion exposed externally through the third surface 3 of the body 110 in the first internal electrode 121 to physically and electrically connect the first internal electrode 121 to the first external electrode 131.

The first band portion 131b is a portion extending from the first band portion 131a to portions of the first, second, fifth, and sixth surfaces 1, 2, 5, and 6, of the body 110, to improve adhesion strength.

The second external electrode 132 may include a second head portion 132a and a second band portion 132b.

The second head portion 132a is disposed on the fourth surface 4 of the body 110, and in contact with an end portion exposed externally through the fourth surface 4 of the body 110 in the second internal electrode 122 to physically and electrically connect the second internal electrode 122 to the second external electrode 132.

The second band portion 132b is a portion extending from the second band portion 132a to a portion of the first, second, fifth, and sixth surfaces 1, 2, 5, and 6, of the body 110, to improve adhesion strength.

Moreover, surfaces of the first and second external electrodes 131 and 132 may be additionally provided with third and fourth plating layers, respectively.

The third and fourth plating layers include third and fourth nickel plating layers covering surfaces of the first and second external electrodes 131 and 132, respectively, and third and fourth tin (Sn) plating layers covering the third and fourth nickel plating layers, respectively.

Figure 4:
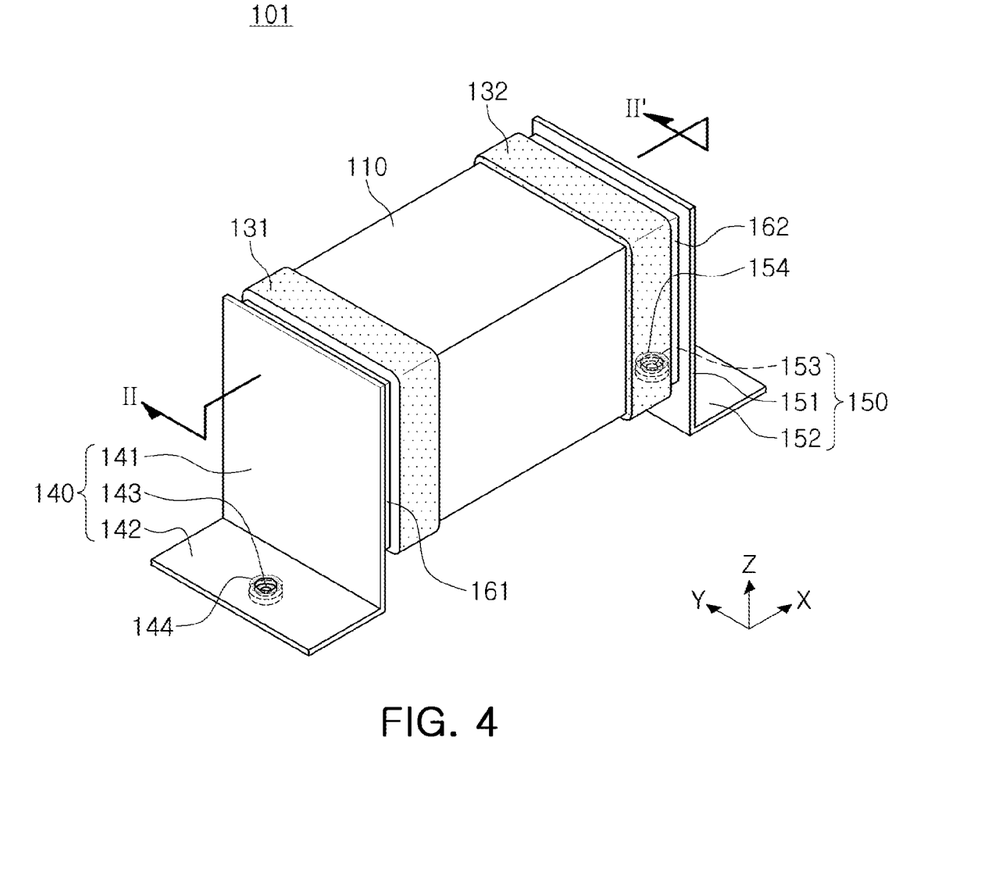
FIG. 4 is a schematic perspective view illustrating a metal frame bonded to the multilayer capacitor of FIG. 1.
Figure 5:
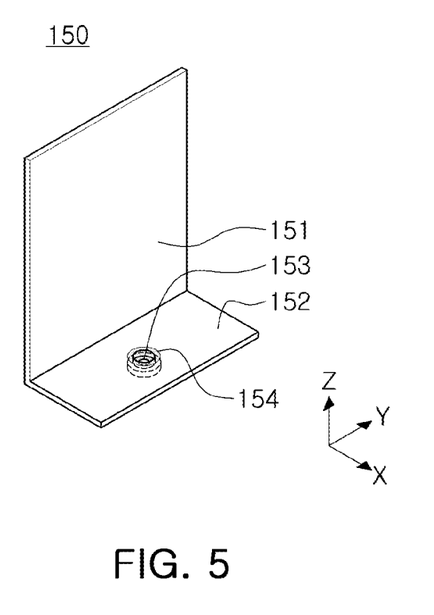
FIG. 5 is a perspective view illustrating a second metal frame separated from FIG. 4.
Figure 6:
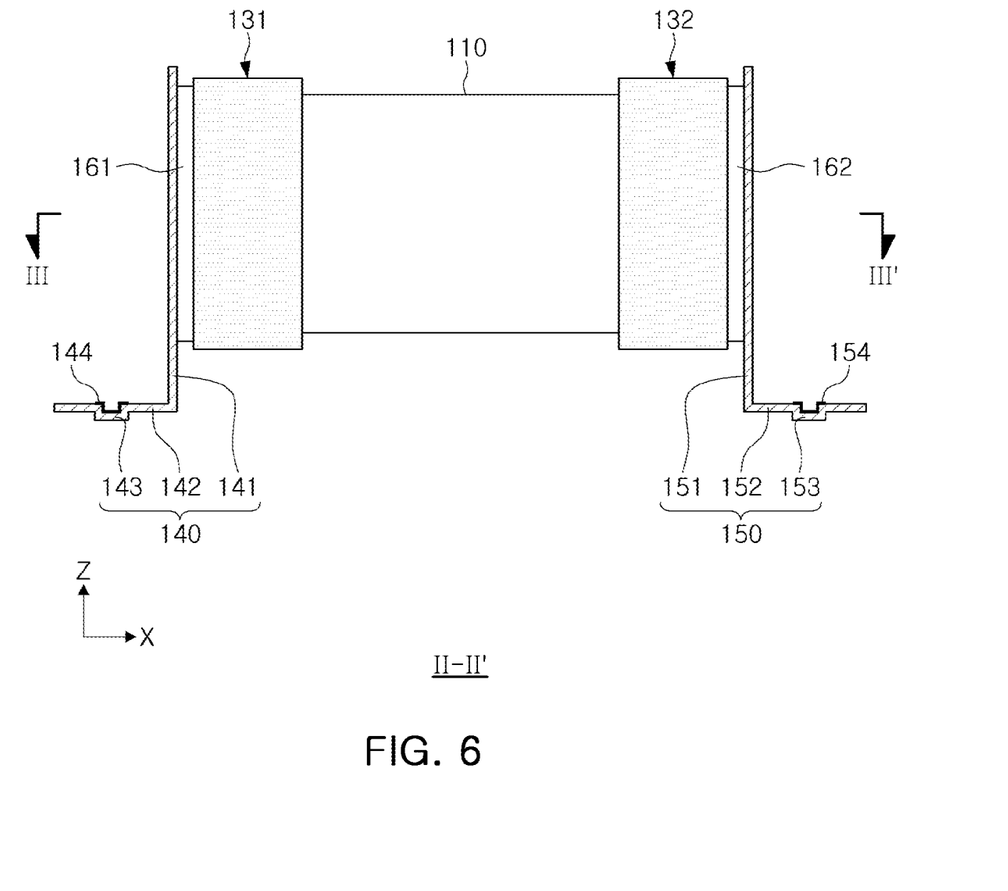
FIG. 6 is a cross-sectional view taken along line II-II' of FIG. 4.
Figure 7:
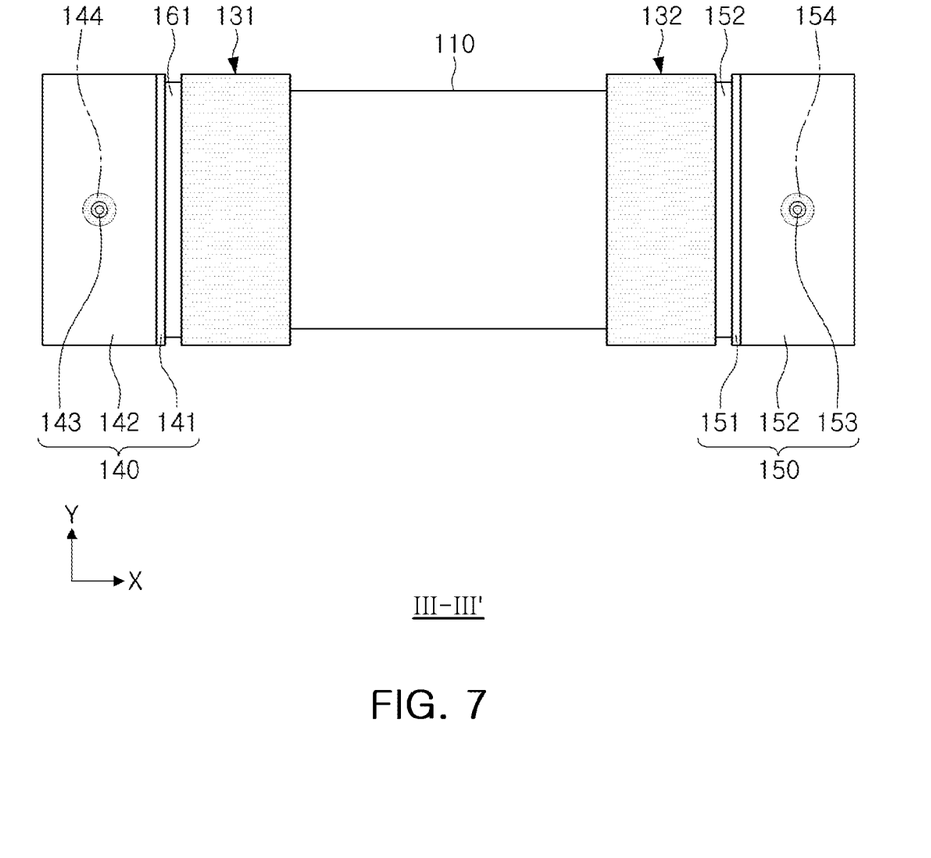
FIG. 7 is a plan view of FIG. 4.

FIG. 4 is a schematic perspective view illustrating a metal frame bonded to the multilayer capacitor of FIG. 1, FIG. 5 is a perspective view illustrating a second metal frame separated from FIG. 4, FIG. 6 is a cross-sectional view taken along line II-II' of FIG. 4, and FIG. 7 is a plan view of FIG. 4.

Referring to FIGS. 4 to 7, an electronic component 101 according to an embodiment includes a multilayer capacitor 100, and first and second metal frames 140 and 150 connected to first and second external electrodes 131 and 132 of the multilayer capacitor 100, respectively.

The first metal frame 140 includes a first support layer 141 and a first mounting portion 142.

The first support layer 141 is formed perpendicular to, or substantially perpendicular to, a mounting surface, and is electrically and physically connected to the first head portion 131a of the first external electrode 131, as a portion bonded to the first head portion 131a of the first external electrode 131.

The first mounting portion 142 serves to a connection terminal when mounted on a board, as a portion extending from a lower end of the first support layer 141 in the X-direction, a first direction, and formed horizontally with respect to a mounting surface.

In this case, the first mounting portion 142 extends toward an opposite side of the first external electrode 131 in the X-direction.

Moreover, the first mounting portion 142 is spaced apart from a lower surface of the multilayer capacitor 100 in the Z-direction by a predetermined distance.

That is, the first mounting portion 142 is spaced apart from the first surface 1 of the body 110 of the multilayer capacitor 100 and first and second band portions 131b and 132b in a lower side in the Z-direction by a predetermined distance.

In addition, a lower surface of the first mounting portion 142 is provided with a first protruding portion 143 downwardly in the Z-direction.

The first protruding portion 143 serves to allow a necessary portion to be sufficiently in contact with a board which is bent or not flat, as a portion is in contact with a laser when an electronic component is mounted on the board.

Moreover, the first mounting portion 142 may be formed of one among Ni, Fe, Cu, Ag, and Cr, or alloys thereof.

As another example, the first mounting portion 142 may be formed of stainless steel (SUS).

In addition, the first mounting portion 142 may be provided with a first groove portion, as an indentation, in an upper surface of the first mounting portion in a position in which the first protruding portion 143 is formed.

Moreover, an upper surface of the first mounting portion 142 is provided with a first coating film 144 to cover an upper surface of the first protruding portion 143 and the first groove portion.

In this case, the first coating film 144 may be formed of a material with high resistance and roughness as compared with the first mounting portion 142 and a first outer plating layer, to be described later, and preferably includes titanium (Ti).

In addition, the first coating film 144 may have a thickness of 0.065 mm to 0.1 mm.

Moreover, surface roughness Rmax of the first coating film 144 may have a value 2 or more times surface roughness of the first mounting portion 142 or the first outer plating layer.

In this regard, a laser is first absorbed by the first coating film 144 formed of Ti with relatively high resistivity and roughness, so welding is completed while reaching a target temperature at the faster time and at lower energy. Thus, costs of a laser process could be saved.

The second metal frame 150 includes a second support layer 151 and a second mounting portion 152.

The second support layer 151 is formed perpendicular to, or substantially perpendicular to, a mounting surface, and electrically and physically connected to the second head portion 132a of the second external electrode 132, as a portion bonded to the second head portion 132a of the second external electrode 132.

The second mounting portion 152 serves to a connection terminal when mounted on a board, as a portion extending from a lower end of the second support layer 151 in the X-direction, a first direction, opposing the first mounting portion 151 in the X-direction, and formed horizontally with respect to a mounting surface.

In this case, the second mounting portion 152 extends toward an opposite side of the second external electrode 132 in the X-direction.

Moreover, the second mounting portion 152 is spaced apart from a lower surface of the multilayer capacitor 100 in the Z-direction by a predetermined distance.

That is, the second mounting portion 142 is spaced apart from the first surface 1 of the body 110 of the multilayer capacitor 100 and first and second band portions 131b and 132b in a lower side in the Z-direction by a predetermined distance.

In addition, a lower surface of the second mounting portion 152 is provided with a second protruding portion 153 downwardly in the Z-direction.

The second protruding portion 153 serves to allow a necessary portion to be sufficiently in contact with a board which is bent or not flat when an electronic component is mounted on the board, as a portion is in contact with a laser when the electronic component is mounted on the board.

Moreover, the second mounting portion 152 may be formed of one among Ni, Fe, Cu, Ag, and Cr, or alloys thereof.

As another example, the second mounting portion 152 may be formed of stainless steel (SUS).

In addition, the second mounting portion 152 may be provided with a second groove portion, as an indentation, in an upper surface of the second mounting portion in a position in which the second protruding portion 153 is formed.

Moreover, an upper surface of the second mounting portion 152 is provided with a second coating film 154 to cover an upper surface of the second protruding portion 153 and the second groove portion.

In this case, the second coating film 154 may be formed of a material with high resistance and roughness as compared with the second mounting portion 152 and a second outer plating layer, to be described later, and preferably includes titanium (Ti).

In addition, the second coating film 154 may have a thickness of 0.065 mm to 0.1 mm.

Moreover, surface roughness Rmax of the second coating film 154 may have a value 2 or more times surface roughness of the second mounting portion 152 or the second outer plating layer.

In this regard, a laser is first absorbed by the second coating film 154 formed of Ti with relatively high resistivity and roughness, so welding is completed while reaching a target temperature at the faster time and at lower energy. Thus, costs of a laser process could be saved.

Figure 9:
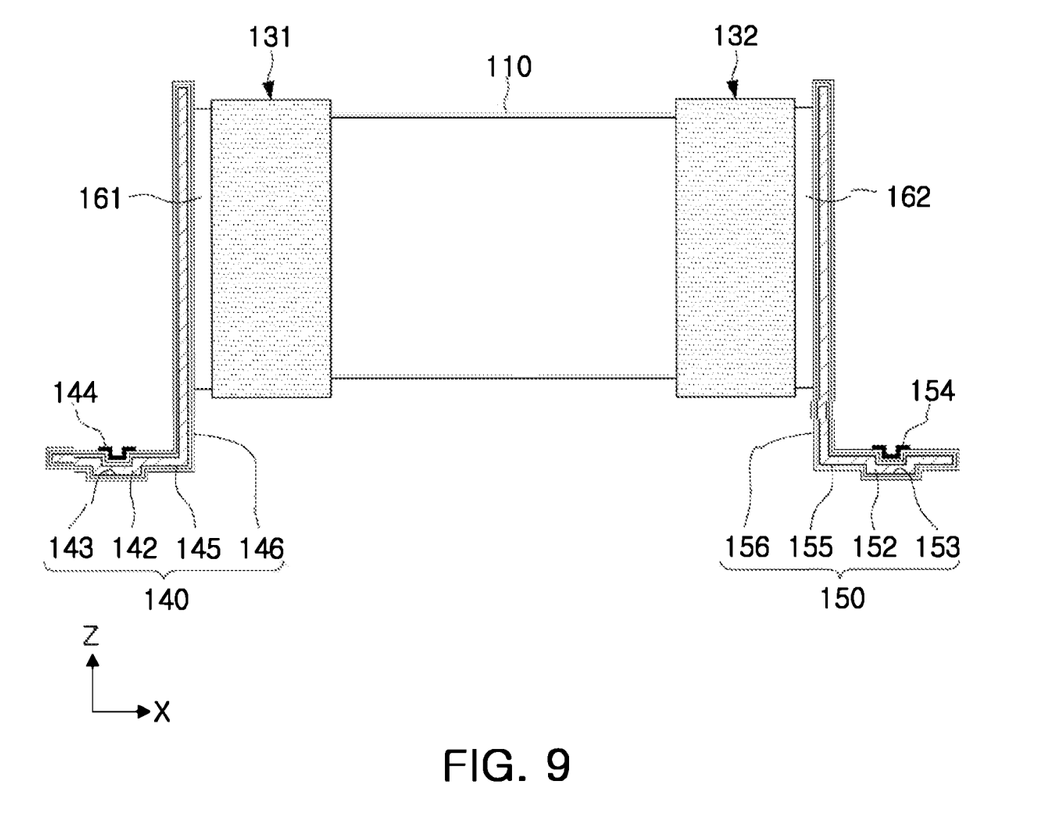
FIG. 9 is a cross-sectional view taken along line II-II' of FIG. 4 showing an alternative exemplary embodiment which includes first and second inner and outer plating layers.

In addition, first and second mounting portions 142 and 152 may further include first and second plating layers formed on surfaces thereof, respectively.

The first and second plating layers include first and second inner plating layers 145, 155, disposed on surfaces of the first and second mounting portions 142 and 152, respectively, and first and second outer plating layers 146, 156, disposed on the first and second inner plating layers, respectively.

In this case, the first and second inner plating layers are formed of Ni, Fe, Cu, Ag, Cr, or an alloy formed of one or more types among those metals, while the first and second outer plating layers are formed of Sn, Ag, Au, or an alloy formed of one or more types among those metals.

Thus, regarding formation of the metal frame according to an embodiment, a mounting portion is formed of a Cu alloy, a nickel plating layer is formed as an inner plating layer thereabove, an Au plating layer is formed above the inner plating layer, and a coating film, formed of Ti, is further formed in a position in which a protruding portion is formed, by way of example.

Moreover, a first conductive bonding layer 161 is disposed between the first external electrode 131 and the first support layer 141, while a second conductive bonding layer 162 may be disposed between the second external electrode 132 and the second support layer 151.

The first conductive bonding layer 161 may be disposed between the first head portion 131a of the first external electrode 131 and the first support layer 141 of the first metal frame 140.

Moreover, the first conductive bonding layer 161 may be formed by including a metal component the same as a metal component of the first head portion 131a of the first external electrode 131.

The second conductive bonding layer 162 may be disposed between the second head portion 132a of the second external electrode 132 and the second support layer 151 of the second metal frame 150.

Moreover, the second conductive bonding layer 162 may be formed by including a metal component the same as a metal component of the second head portion 132a of the second external electrode 132.

Figure 8:
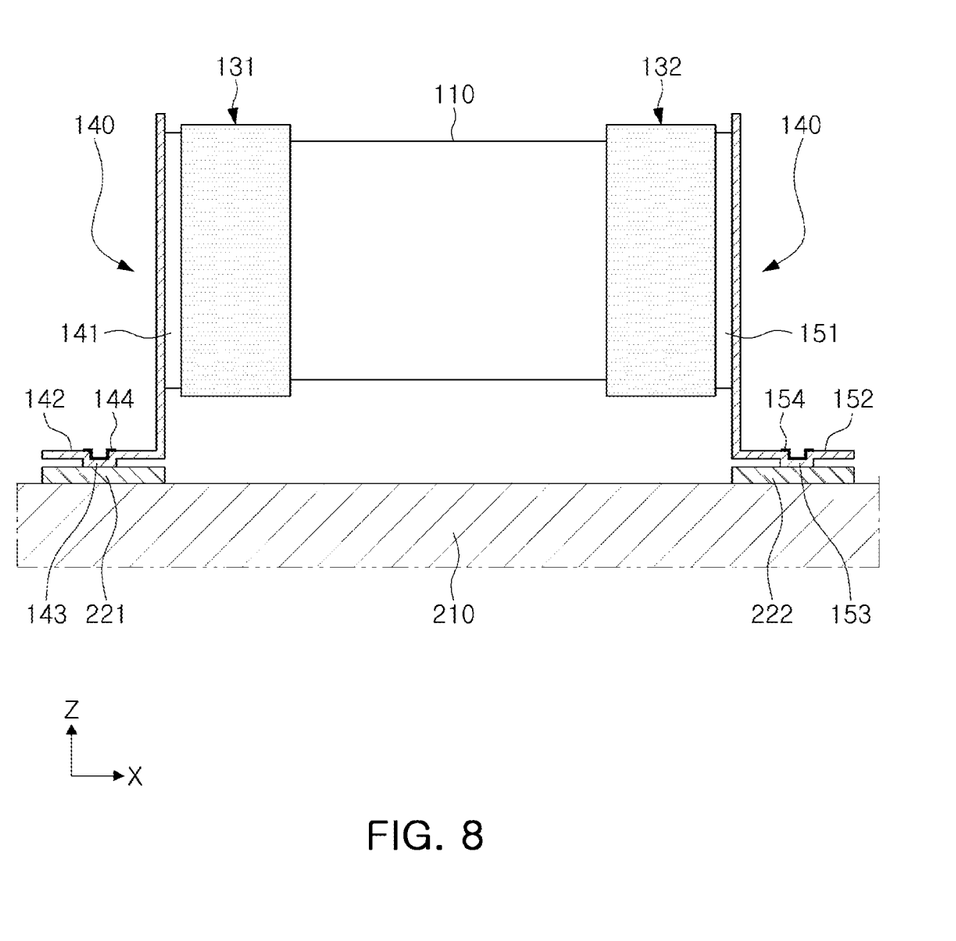
FIG. 8 is a schematic cross-sectional view illustrating an electronic component mounted on a board according to an embodiment of the present disclosure.

FIG. 8 is a schematic cross-sectional view illustrating an electronic component mounted on a board according to an embodiment of the present disclosure.

Referring to FIG. 8, a mounting board according to an embodiment includes a board 210, and first and second land patterns 221 and 222 spaced apart from each other in an upper surface of the board 210.

In this case, in the electronic component 101, first and second protruding portions 143 and 153 of first and second mounting portions 142 and 152 of first and second metal frames 140 and 150 are connected while located to be in contact with upper portions of the first and second land patterns 221 and 222, respectively, and bonded by each other by laser welding to be electrically and physically connected to each other.

The electronic component, including a metal frame, may be mounted on a board by laser welding.

In this case, in order to reduce the operation time and perform an operation at further weaker energy during laser welding, it is necessary to increase laser absorption of a subject.

In an embodiment, a coating film is formed in an upper surface of a protruding portion on which laser welding is performed, and the coating film includes Ti with high resistivity and roughness, so the laser absorption may be significantly increased.

In this regard, an effect of reducing the operation time and performing an operation at further weaker energy during laser welding could be expected.

In the case of the multilayer capacitor according to the related art, a capacitor body and a board are directly in contact with each other by a solder when mounted on a board, and thus heat or mechanical deformation occurring in a board is directly transferred to the multilayer capacitor. Thus, it is difficult to secure a high level of reliability.

However, in an embodiment, first and second metal frames are bonded to both sides of the multilayer capacitor in the X-direction, so a distance between the multilayer capacitor and the mounting board is secured. Thus, stress from a board is not directly transferred to the multilayer capacitor, so reliability may be improved.

Moreover, in an electronic component having a structure to which a metal frame is bonded according to the related art, a land pattern of a board and a metal frame of a multilayer capacitor are fixed using a solder.

In this case, when soldering is performed to mount an electronic component on a board, due to a reflow temperature, a problem often occurs, in which a metal frame and a bonding portion of a multilayer capacitor are melted and separated from each other.

In an embodiment, a protruding portion is formed in a mounting portion, so the protruding portion is welded using a laser while being in contact with the land pattern. Thus, the metal frame and the land pattern are bonded to each other.

Thus, the mounting density is increased in a limited space, and an insulation distance between left and right metal frames is sufficiently ensured. Thus, insulating properties between adjacent electronic components may be secured.

Moreover, a separation problem of a metal frame and a multilayer capacitor due to soldering according to the related art may be solved.

In addition, in an electronic component according to an embodiment, first and second coating films, formed of a material including Ti, are formed in first and second protruding portions, so the operation time may be reduced and an operation may be performed at further weaker energy during laser welding. Thus, costs of a laser process may be saved.

As set forth above, according to an embodiment in the present disclosure, first and second protruding portions are provided to be connected to first and second mounting portions of first and second metal frames during laser welding, so the mounting density is increased in a limited space, and an insulation distance between left and right metal frames is sufficiently ensured, so insulating properties between adjacent electronic components may be secured. In addition, first and second coating films, formed of a material including Ti, are formed in the first and second protruding portions, so the operation time may be reduced and an operation may be performed at further weaker energy during laser welding.

While exemplary embodiments have been shown and described above, it will be apparent to those skilled in the art that modifications and variations could be made without departing from the scope of the present invention as defined by the appended claims.

What is claimed is:

1. An electronic component, comprising:
   a body;
   first and second external electrodes disposed on both ends of the body in a first direction, respectively;
   a first metal frame including a first support layer bonded to the first external electrode, a first mounting portion extending in the first direction in a lower end of the first support layer and having a first protruding portion on a lower surface, and a first coating film covering an upper surface of the first protruding portion on an upper surface of the first mounting portion and including titanium (Ti); and
   a second metal frame including a second support layer bonded to the second external electrode, a second mounting portion extending in the first direction in a lower end of the second support layer and having a second protruding portion on a lower surface of the second mounting portion, and a second coating film covering an upper surface of the second protruding portion on an upper surface of the second mounting portion and including Ti.

2. The electronic component of claim 1, wherein the first mounting portion has a first indentation portion in the upper surface of the first mounting portion in a position in which the first protruding portion is disposed, and
   the second mounting portion has a second indentation portion in the upper surface of the second mounting portion in a position in which the second protruding portion is disposed.

3. The electronic component of claim 2, wherein the first indentation portion includes a first groove, and
   the second indentation portion includes a second groove.

4. The electronic component of claim 1, wherein the first mounting portion extends toward an opposite side of the first external electrode, and
   the second mounting portion extends toward an opposite side of the second external electrode.

5. The electronic component of claim 1, wherein the first and second mounting portions are composed of one among Ni, Fe, Cu, Ag, and Cr or alloys thereof.

6. The electronic component of claim 1, wherein the first and second mounting portions are composed of stainless steel (SUS).

7. The electronic component of claim 1, wherein the first and second mounting portions are provided with first and second plating layers disposed thereon, respectively.

8. The electronic component of claim 7, wherein the first and second plating layers include first and second inner plating layers, disposed on surfaces of the first and second mounting portions, respectively, and first and second outer plating layers, disposed on the first and second inner plating layers, respectively.

9. The electronic component of claim 1, wherein the body includes:
   a dielectric layer; and
   first and second internal electrodes alternately arranged with the dielectric layer interposed therebetween, and having one ends exposed through both sides of the body in the first direction to be connected to the first and second external electrodes, respectively.

10. The electronic component of claim 1, wherein the first and second external electrodes include:
    first and second head portions disposed on both sides of the body in the first direction, respectively; and
    first and second band portions extending to a portion of upper and lower surfaces and a portion of both side surfaces of the body from the first and second head portions, respectively.

11. The electronic component of claim 10, wherein, in the first and second metal frames,
    the first and second support layers are bonded to first and second head portions of the first and second external electrodes, respectively, and
    the first and second mounting portions are spaced apart from the body and the first and second band portions.

12. The electronic component of claim 1, further comprising: a first conductive bonding layer disposed between the first external electrode and the first support layer, and a second conductive bonding layer disposed between the second external electrode and the second support layer.

13. The electronic component of claim 1, further comprising: third and fourth plating layers disposed on surfaces of the first and second external electrodes, respectively,
    wherein the third and fourth plating layers include third and fourth nickel plating layers covering the first and second external electrodes, respectively, and third and fourth tin plating layers covering the third and fourth nickel plating layers, respectively.

14. The electronic component of claim 1, wherein the first coating film extends from the upper surface of the first protruding portion onto a portion of the upper surface of the first mounting portion, and is spaced apart from an edge of the upper surface of the first mounting portion, and
    the second coating film extends from the upper surface of the second protruding portion onto a portion of the upper surface of the second mounting portion, and is spaced apart from an edge of the upper surface of the second mounting portion.

15. The electronic component of claim 1, wherein a surface roughness of the first coating film is greater than that of the upper surface of the first mounting portion, and
    a surface roughness of the second coating film is greater than that of the upper surface of the second mounting portion.

16. A board having an electronic component mounted thereon, comprising:
- a board having first and second land patterns spaced apart from each other in an upper surface: and
- the electronic component according to claim 1 mounted,
- wherein the first and second protruding portions of the first and second mounting portions of the first and second metal frames are connected to the first and second land patterns of the board, respectively.

17. An electronic component, comprising:
- a body;
- first and second external electrodes disposed on both ends of the body in a first direction, respectively;
- a first metal frame including a first support layer bonded to the first external electrode, a first mounting portion extending in the first direction in a lower end of the first support layer and having a first protruding portion on a lower surface, and a first coating film covering an upper surface of the first protruding portion on an upper surface of the first mounting portion; and
- a second metal frame including a second support layer bonded to the second external electrode, a second mounting portion extending in the first direction in a lower end of the second support layer and having a second protruding portion on a lower surface of the second mounting portion, and a second coating film covering an upper surface of the second protruding portion on an upper surface of the second mounting portion, wherein the first coating film extends from the upper surface of the first protruding portion onto a portion of the upper surface of the first mounting portion, and is spaced apart from an edge of the upper surface of the first mounting portion, and the second coating film extends from the upper surface of the second protruding portion onto a portion of the upper surface of the second mounting portion, and is spaced apart from an edge of the upper surface of the second mounting portion.

18. The electronic component of claim 17, wherein the first mounting portion has a first indentation portion in the upper surface of the first mounting portion in a position in which the first protruding portion is disposed, and
- the second mounting portion has a second indentation portion in the upper surface of the second mounting portion in a position in which the second protruding portion is disposed.

19. The electronic component of claim 18, wherein the first indentation portion includes a first groove, and
- the second indentation portion includes a second groove.

20. The electronic component of claim 17, wherein a surface roughness of the first coating film is greater than that of the upper surface of the first mounting portion, and
- a surface roughness of the second coating film is greater than that of the upper surface of the second mounting portion.

* * * * *